US006404484B1

(12) United States Patent
Sogawa

(10) Patent No.: US 6,404,484 B1
(45) Date of Patent: Jun. 11, 2002

(54) METHOD FOR EXAMINING DISTANCE DATA AND DEVICE THEREOF

(75) Inventor: Yoshiyuki Sogawa, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/667,425

(22) Filed: Sep. 21, 2000

(30) Foreign Application Priority Data

Sep. 22, 1999 (JP) .......................................... 11-269347

(51) Int. Cl.⁷ .......................... G01C 5/00; G01C 3/08; G03B 13/34; B60T 7/16
(52) U.S. Cl. ..................... 356/3.14; 356/4.01; 396/121; 180/167
(58) Field of Search ............... 396/121; 356/3.13–3.16; 180/167

(56) References Cited

U.S. PATENT DOCUMENTS

| 5,307,136 A | | 4/1994 | Saneyoshi |
| 5,526,088 A | * | 6/1996 | Kusaka |
| 6,114,973 A | * | 9/2000 | Winner et al. |
| 6,205,380 B1 | * | 3/2001 | Bauer et al. |

FOREIGN PATENT DOCUMENTS

| JP | 5-114099 | 5/1993 |
| JP | 10-307352 | 11/1998 |

* cited by examiner

*Primary Examiner*—Stephen C. Buczinski
(74) *Attorney, Agent, or Firm*—Smith, Gambrell & Russell LLP

(57) ABSTRACT

In a method of examining the reliability of distance data calculated based on stereoscopic images, a pair of photographed images is obtained by taking pictures of a test chart 21 carrying a brightness pattern with a stereo camera, the test chart 21 being placed in a shooting direction of the stereo camera. The distance data is calculated from these photographed images by stereo matching. Using the distance data concerning the test chart shown in the photographed images as the evaluation samples, a histogram showing a relationship between distance values of evaluation samples and their frequency of occurrence is produced. The reliability of the calculated distance data is judged by evaluating properties of the histogram thus produced based on the distance between the stereo camera and the test chart.

17 Claims, 7 Drawing Sheets

FIG. 4
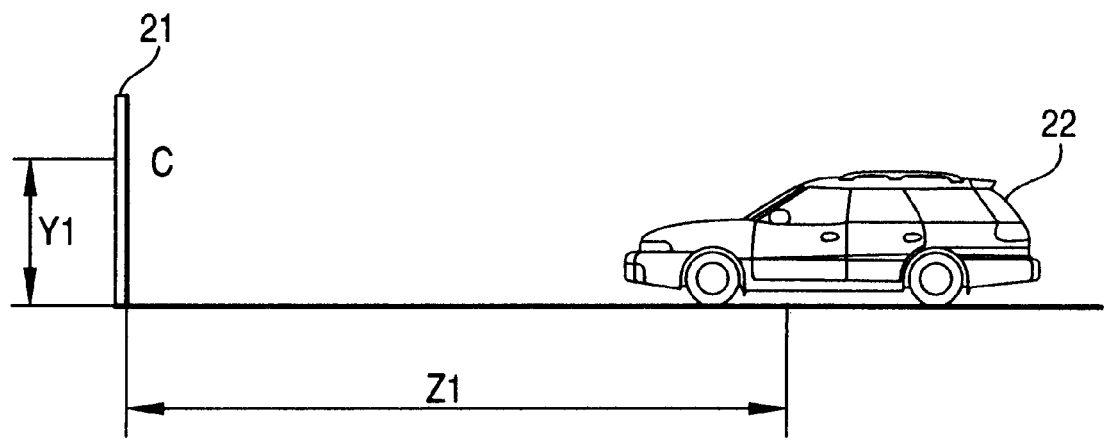
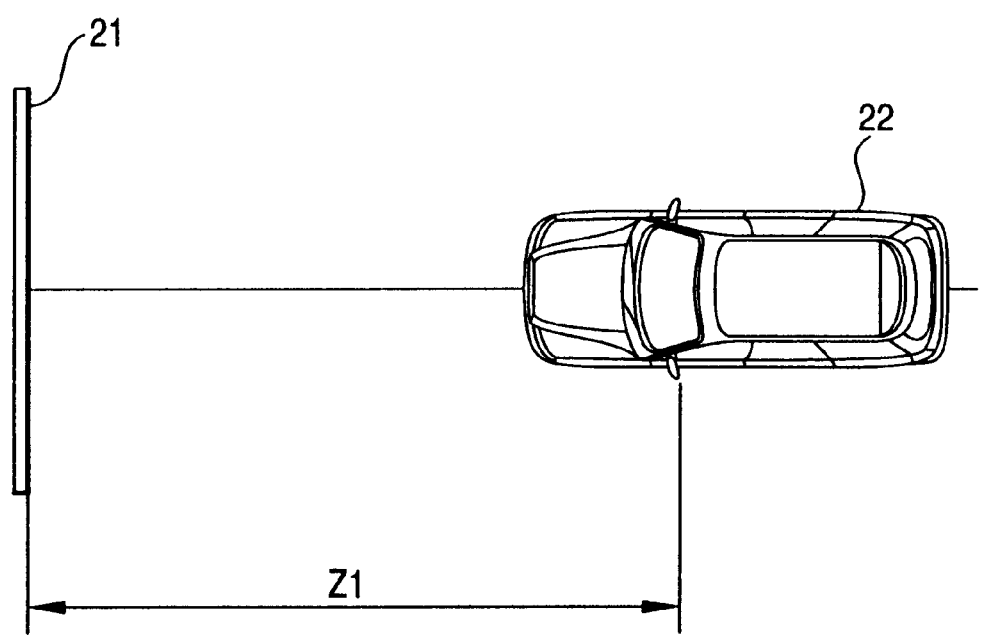

METHOD FOR EXAMINING DISTANCE DATA AND DEVICE THEREOF

BACKGROUND OF THE INVENTION

1. Field of the Invention

The present invention relates to a method of examining distance data calculated based on stereoscopic images as well as to an examination device for performing such examination.

2. Description of the Related Art

Considerable attention is given in recent years to outside view monitoring systems using a stereo camera system as a preview sensor. This kind of monitoring system takes pictures of views in front of own vehicle with a pair of onboard cameras (stereo camera system) fitted to a vehicle body and calculates distance data based on a pair of images obtained using the principle of triangulation. Then, based on the calculated distance data, the monitoring system recognizes traffic conditions ahead of own vehicle, and call a driver's attention as the need arises or performs vehicle behavior control operation such as deceleration by a downshift.

When this kind of stereo camera system is fitted to the vehicle body, a high degree of accuracy is required with respect to its mounting position. This is because an error in the mounting position of the stereo camera system results in a deviation of the shooting direction of the stereo camera system, directly affecting calculated distance data. Besides this, there are cases where the reliability of the calculated distance data decreases due to unbalanced sensitivity of the stereo camera system, the influence of camera lens properties, or improper image corrections, for instance.

Thus, it is necessary to calculate distance data from stereoscopic images obtained by actually taking pictures with a stereo camera system and then examine the results of calculation in a testing process to be carried out upon completion of the installation of the stereo camera system. Conventionally, however, examination technique of this kind has not been established and, therefore, it has strongly been desired to establish examination technique which would make it possible to achieve improved efficiency and automation of examination.

SUMMARY OF THE INVENTION

This invention has been made in consideration of the aforementioned circumstances. Accordingly, it is an object of the invention to provide an examination method which makes it possible efficiently and accurately examine the reliability of distance data calculated based on stereoscopic images.

To solve the aforementioned problems, a first aspect of the invention provides a method of examining the reliability of distance data calculated based on stereoscopic images, the method of examining the distance data comprising the steps of obtaining a pair of photographed images by taking pictures of a test chart carrying a brightness pattern with a stereo camera, the test chart being placed in a shooting direction of the stereo camera, calculating the distance data from the two photographed images, producing a histogram showing a relationship between distance values of evaluation samples and their frequency of occurrence by adopting the distance data concerning the test chart shown in the photographed images as the evaluation samples, and judging the reliability of the calculated distance data by evaluating properties of the histogram thus produced based on the distance between the stereo camera and the test chart.

Here, it is preferable that the aforementioned step of judging be a step which judges the reliability of the calculated distance data based on the ratio of the frequency of occurrence of the evaluation samples included in an appropriate range set in the histogram to the total number of the evaluation samples. This appropriate range is a specific distance range including the distance between the stereo camera and the test chart.

The aforementioned step of judging may be a step which judges the reliability of the calculated distance data based on whether a peak distance value concerning the frequency of occurrence which forms a peak in the histogram exists within an appropriate range. This appropriate range is a specific distance range including the distance between the stereo camera and the test chart.

This peak distance value may be a distance value whose frequency of occurrence is at a maximum. Alternatively, the peak distance value may be calculated based on a distance value whose frequency of occurrence is at a maximum or a distance value adjacent to the distance value whose frequency of occurrence is at a maximum, whichever gives a higher frequency of occurrence. Furthermore, it is preferable to use a distance value calculated in sub-pixel units.

The aforementioned step of producing the histogram may be a step which adopts distance data derived from each of multiple evaluation sub-areas set in the photographed images as the evaluation samples and produces histograms showing a relationship between the distance values of the evaluation samples and their frequency of occurrence. In this case, the aforementioned step judges whether peak distance values in peak portions, in which the frequency of occurrence reaches its peak, exist within the appropriate range for each of the histograms, and further judges that calculation results of the distance data are good when all of the peak distance values have been judged to exist within the appropriate range.

An examination device of a second invention for examining the reliability of distance data calculated by a stereoscopic outside view monitoring system comprises a stereo camera which is fitted to a vehicle body and outputs a pair of photographed images by taking pictures of conditions ahead of the vehicle, stereo processing means for calculating the distance data from the pair of photographed images, and examination means which judges the reliability of the distance data based on the photographed images obtained by taking pictures of a test chart carrying a brightness pattern with the stereo camera, the test chart being placed at a predetermined position ahead of the vehicle during examination. This examination means adopts distance data derived from an evaluation area which is provided at a central part of each of the photographed images as evaluation samples, produces a histogram showing a relationship between distance values of the evaluation samples and their frequency of occurrence, and judges the reliability of the calculated distance data by evaluating properties of the histogram thus produced based on the distance between the stereo camera and the test chart.

Here, the examination means may judge the reliability of the calculated distance data based on the ratio of the frequency of occurrence of the evaluation samples included in an appropriate range set in the histogram to the total number of the evaluation samples. This appropriate range is a specific distance range including the distance between the stereo camera and the test chart.

The examination means may judge the reliability of the calculated distance data based on whether a peak distance value concerning the frequency of occurrence which forms a peak in the histogram exists within an appropriate range. This appropriate range is a specific distance range including the distance between the stereo camera and the test chart.

Furthermore, the examination means may adopt distance data derived from each of multiple evaluation sub-areas set in the photographed images as the evaluation samples and produce histograms showing a relationship between the distance values of the evaluation samples and their frequency of occurrence. In this case, the examination means judges whether peak distance values in peak portions, in which the frequency of occurrence reaches its peak, exist within the appropriate range for each of the histograms, and further judges that calculation results of the distance data are good when all of the peak distance values have been judged to exist within the appropriate range.

In the first and second inventions, it is preferable to use a brightness pattern having a configuration in which blocks of the same shape but varying brightness gradations are arranged at random.

BRIEF DESCRIPTION OF THE DRAWINGS

FIG. 4 is a diagram showing a relationship between a position where a test chart is placed and a vehicle;

DETAILED DESCRIPTION OF THE PREFERRED EMBODIMENT

First Embodiment

Figure 1:
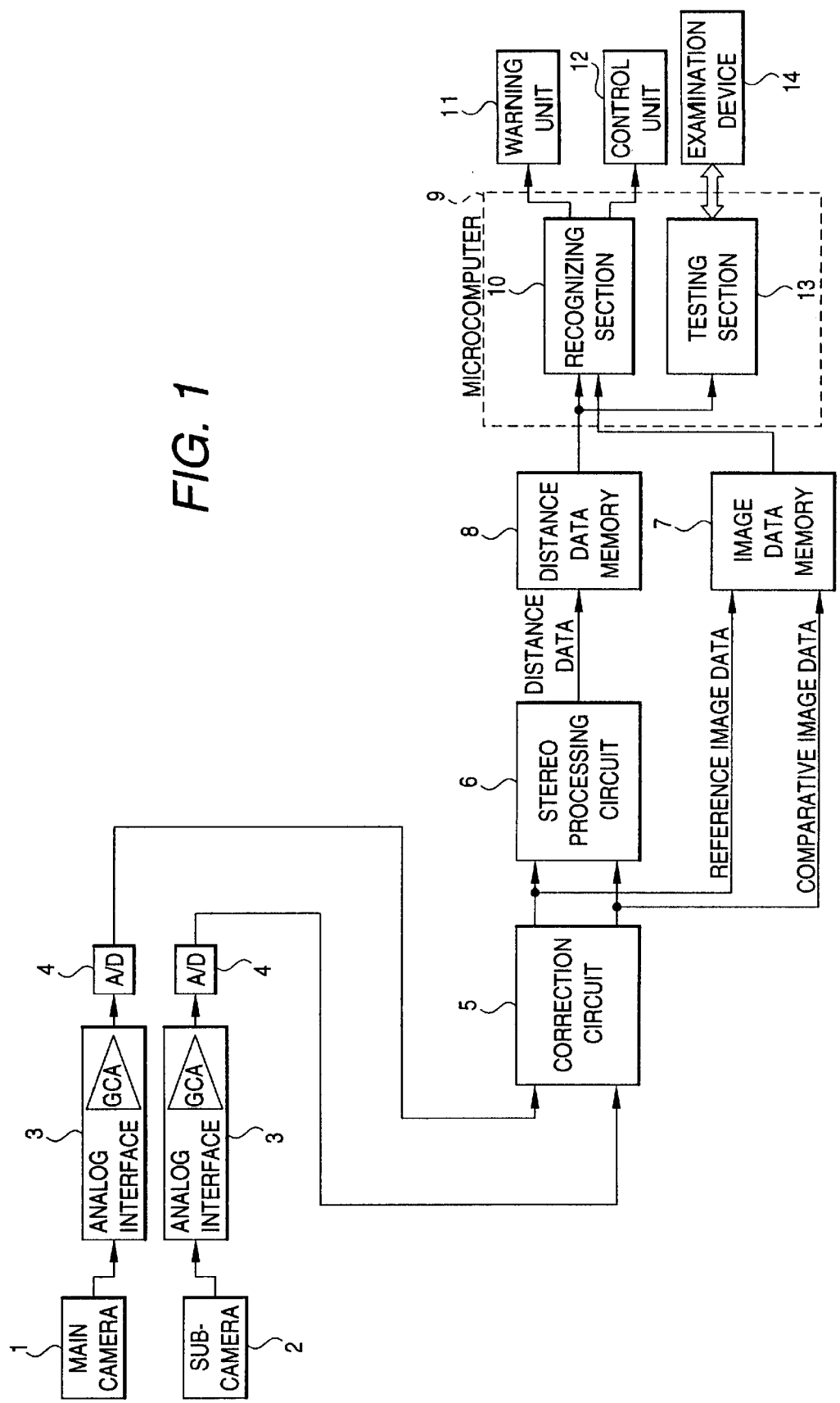
FIG. 1 is a block diagram of a stereoscopic outside view monitoring system according to first and second embodiments.

FIG. 1 is a block diagram of a stereoscopic outside view monitoring system. A stereo camera system which takes pictures of outside views of a vehicle is mounted in the vicinity of its rear-view mirror and formed of a pair of cameras 1, 2, each incorporating an image sensor such as a charge-coupled device (CCD). These cameras 1, 2 are installed with a specific distance from each other in the direction of vehicle width. The main camera 1 for obtaining reference image data is installed on the right side of the vehicle's forward direction. On the other hand, the sub-camera 2 for obtaining a comparative image is installed on the left side of the forward direction.

In a condition in which the pair of the cameras 1, 2 is synchronized, analog images output from the individual cameras 1, 2 are adjusted in analog interfaces 3 such that the analog images match input ranges of succeeding stages. Also, brightness balance of the images is adjusted by a gain control amplifier (GCA) in each analog interface 3. The analog images output from the analog interfaces 3 are converted into digital images of specific gradations of brightness (e.g., 256 shades on a gray scale) by analog-to-digital (A/D) converters 4. The images thus digitized are then subjected to a correction, such as affine transformation, which is performed by a correction circuit 5.

The reference image data (brightness data) of 512 pixels in the horizontal direction by 200 pixels in the vertical direction is produced from an output signal of the main camera 1 through the aforementioned image processing. Also, from an output signal of the sub-camera 2, comparative image data having the same vertical length as the reference image and a greater horizontal length than the reference image (640 pixels in the horizontal direction by 200 pixels in the vertical direction, for example) is obtained. The reference image data and the comparative image data are stored in an image data memory 7.

A stereo processing circuit 6 calculates parallaxes based on the reference image data and the comparative image data. Since the parallax is calculated for each individual pixel block of 4×4 pixels, a maximum of 128×50 parallaxes can be obtained from one complete frame of the reference image. Considering one pixel block in the reference image, a region (correlated destination) having a correlation with brightness properties of the subject pixel block (correlated source) is identified by searching for the comparative image (stereo matching). As is commonly known, the distance to an object photographed in stereoscopic images is observed as a parallax in the stereoscopic images, that is, as the amount of deviation in a horizontal direction between the reference image and the comparative image. Therefore, when searching for the comparative image, search is to be made on the same horizontal line (epipolar line) as the j-coordinate of the subject pixel block. While shifting a search point pixel by pixel along the epipolar line, the stereo processing circuit 6 evaluates the correlation between the individual pixel blocks and the subject pixel block.

The correlation between two pixel blocks can be evaluated by calculating city block distance CB shown in equation 1, for instance. In this equation, p1ij represents a brightness value of pixel (i, j) of one pixel block, while p2ij represents a brightness value of pixel (i, j) of the other pixel block. The city block distance CB is the sum of differences (absolute value) between the two geographically corresponding brightness values p1ij, p2ij for one complete pixel block, wherein the smaller the differences, the greater the correlation between the two pixel blocks.

$$CB = \Sigma |p1ij - p2ij| \qquad \text{(Equation 1)}$$

Basically, a pixel block which gives a minimum value of city block distance CB among city block distances CB calculated for the individual pixel blocks existing on the epipolar line is judged to be the correlated destination of the subject pixel block. The amount of deviation between the correlated destination thus identified and the subject pixel block is the parallax.

The stereo processing circuit 6 also evaluates the presence or absence of a brightness edge (the amount of brightness change) in the horizontal direction of the pixel block, as well as its relationship with maximum and minimum values of the city block distance CB calculated on the same epipolar line. Furthermore, to ensure reliability as distance data, the stereo processing circuit 6 performs filtering operation on the calculated parallax based on these evaluation results and outputs only such parallax d that has been judged to be valid (hereinafter referred to as the valid parallax). Reference should be made to Japanese Unexamined Patent Publication No. Hei. 5-114099(JP-A-5-114099) for details of hardware configuration and filtering operation for calculating the city block distance, if necessary, since they are disclosed therein. The valid parallax d calculated through the aforementioned operation is stored in a distance data memory 8.

The expression "distance data" used in the following explanation means the valid parallax d stored in the distance data memory 8. Also, the expression "distance image" refers to output status of the distance data for the whole image areas. In other words, it means a conceptual image related to locations in image areas for which the individual distance data d are calculated.

A microcomputer 9 (or a recognizing section 10 which is a functional block of the microcomputer 9 when viewed from a functional point of view) recognizes road shapes (white lines) and each three-dimensional object (running vehicle) ahead of own vehicle, for example. Their recognition is made based on the image data stored in the image data memory 7 and the distance data d (valid parallax) stored in the distance data memory 8. Sensor information fed from a vehicle speed sensor and a steering angle sensor, which are not illustrated, as well as navigation information are also referred to as necessary. If it is judged to be necessary to give a warning against a curve or a three-dimensional object ahead of the vehicle based on the results of such recognition, the microcomputer 9 activates a warning unit 11, such as a monitor or a speaker, to thereby draw a driver's attention. Also, the microcomputer 9 performs such vehicle control operation as a downshift of an AT (automatic transmission), a reduction in engine output, or activation of brakes by controlling a control unit 12 as the need arises.

An examination device 14 is an add-on unit which is connected only in a product testing process. When a command is given to start the testing process by the examination device 14 with the examination device 14 connected to the microcomputer 9, the microcomputer 9 (or a testing section 13 which is a functional block of the microcomputer 9 when viewed from a functional point of view) carries out a preprogrammed examination routine. The testing section 13 automatically examines distance output status from test samples according to a flowchart shown in FIG. 2.

Figure 2:
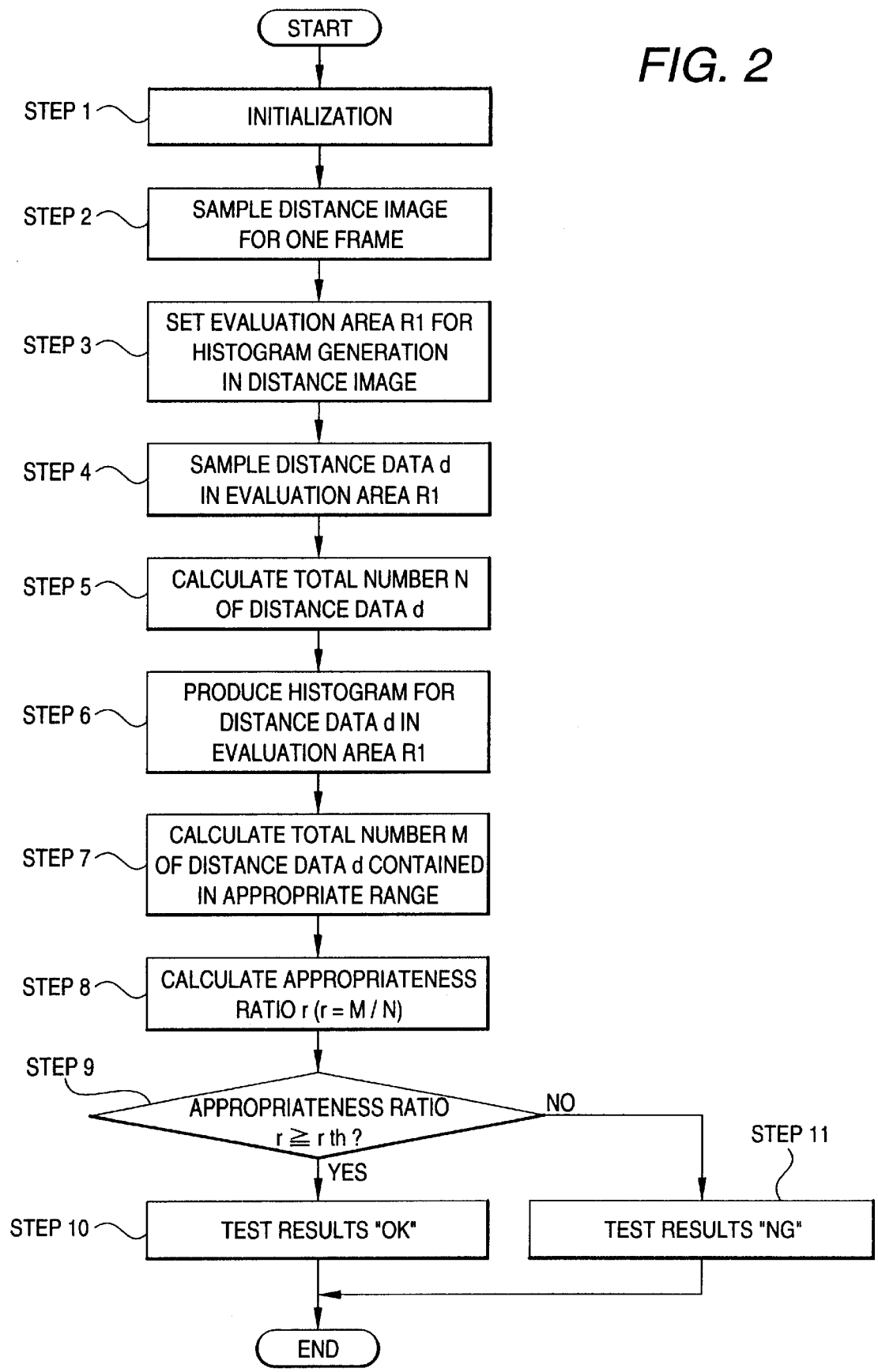
FIG. 2 is a flowchart showing a procedure of examining calculated distances according to a first embodiment.
Figure 5:
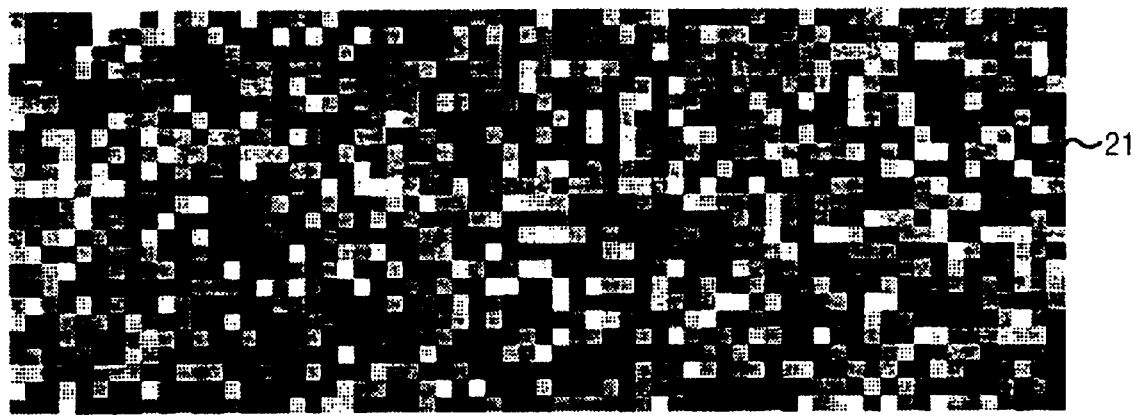
FIG. 5 is a diagram showing an example of the test chart.

FIG. 2 is the flowchart showing a procedure of examining calculated distances according to a first embodiment. First, an examiner places a test chart carrying a specific pattern at a specified position ahead of the vehicle before entering a command to start the examination routine. FIG. 4 is a diagram showing a relationship between the position where the test chart 21 is placed and the vehicle to be tested, and FIG. 5 is a diagram showing an example of the test chart 21 used in this examination. This test chart 21 carries a random pattern in which brightness blocks with specific gradations of brightness (e.g., 16 shades of on a gray scale) are randomly arranged (that is, without any regularity in brightness variations). To maintain the accuracy of stereo matching, the area of each brightness block is set such that the brightness block shown in a photographed image would be as large as about 3×3 pixels. Referring to FIG. 4, the test chart 21 is disposed at a distance Z1 from a position where the stereo camera system is mounted in the vehicle's longitudinal direction (Z-axis), such that a crisscross intersection C is located at a height Y1 from the ground in the vehicle's height direction (Y-axis) and the flat surface of the test chart 21 becomes parallel to the vehicle's lateral direction (X-axis). If the test chart 21 is photographed by the cameras 1, 2 in such conditions, the test chart 21 is shown in captured images.

When the examiner enters a command to start examination by operating the examination device 14, the microcomputer 9 (i.e., the testing section 13) first performs system initialization in step 1 and, then, samples a distance image for one complete frame (step 2).

Figure 6:
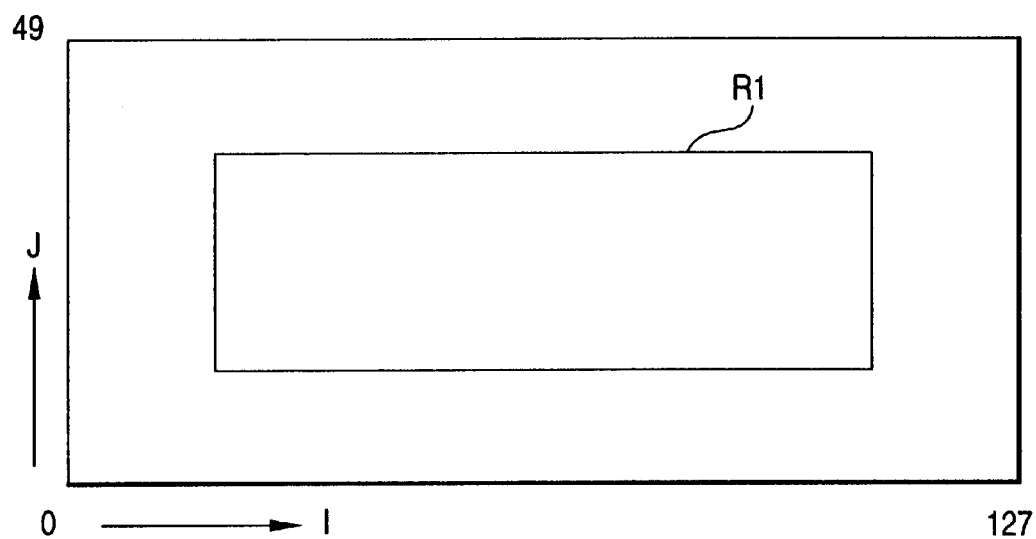
FIG. 6 is a diagram showing an evaluation area R1 set in a distance image.

Succeeding to step 2, an evaluation area R1 for which a histogram is to be produced is set in the distance image (step 3), and distance data d in the evaluation area R1 are sampled (step 4). A brightness pattern of the test chart 21 is represented in this evaluation area R1. Here, evaluation samples to be examined are distance data d calculated for pixel blocks existing in this area R1, that is, the distance data d concerning the brightness pattern that the test chart 21 has. FIG. 6 is a diagram showing the evaluation area R1 set in the distance image. As shown in this Figure, the evaluation area R1 is set in a region excluding peripheral parts of the distance image. The reason why the peripheral parts of the image are excluded is that distance data d containing errors are likely to be calculated in the peripheral parts due to the effects of lens distortion of the stereo camera system, for instance. Theoretically, the values of all the distance data d which are the evaluation samples become equal to the distance (parallax) from the stereo camera system to the test chart 21.

In step 5 which follows step 4, the testing section 13 counts the number of the distance data d, or the evaluation samples, existing in the evaluation area R1 and calculates a total number N. Although the total number N thus calculated could equal the number of the pixel blocks within the evaluation area R1 at a maximum, it usually becomes a smaller number (which corresponds to the number of valid parallaxes) due to the filtering operation performed by the stereo processing circuit 6.

Figure 8:
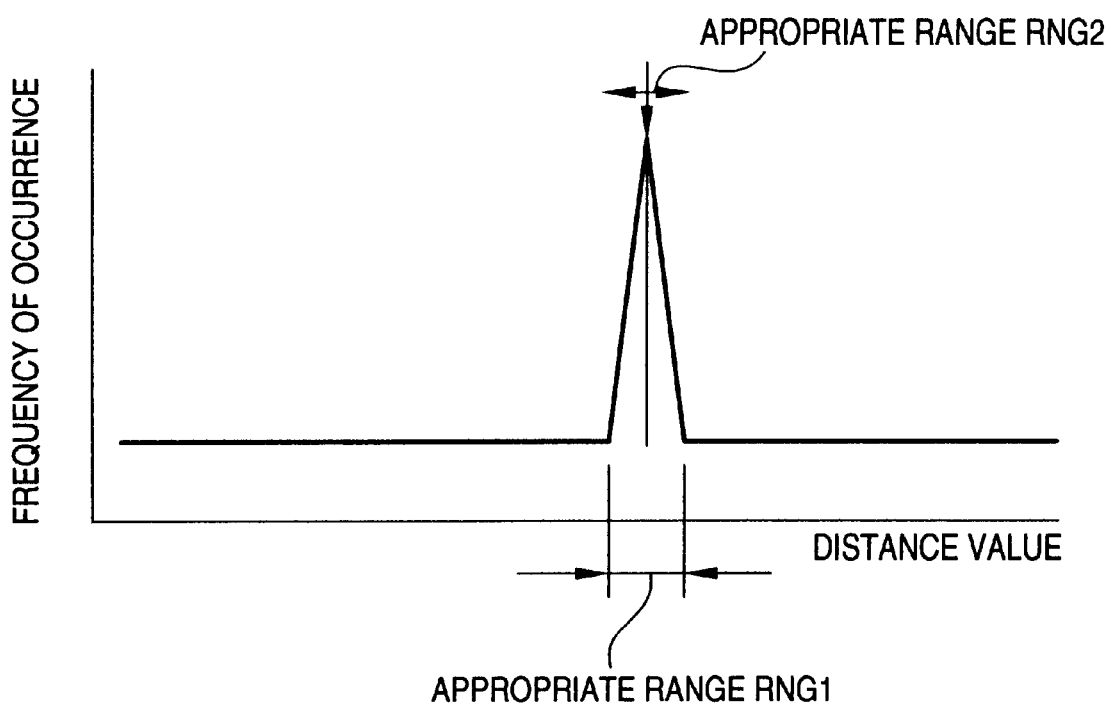
FIG. 8 is a diagram showing a histogram of distance data.

Then, based on the evaluation samples identified in step 5, a histogram showing a relationship between the values of the distance data within the evaluation area R1 and their frequency of occurrence is produced (step 6). FIG. 8 is a diagram showing a histogram of the parallaxes in the distance image for one complete frame. According to characteristic features of the histogram under normal conditions, a sharp and high peak appears at a distance not greater than the distance Z1 to the test chart 21.

In step 7 which follows step 6, the number of the distance data d included in a specific appropriate range RNG1 is counted and a total number M is calculated. The appropriate range RNG1 is set based on the distance Z1 to the test chart 21. This range serves as a reference in judging compliance or non-compliance of each distance calculated, and is set depending on the required level of the accuracy of testing. In the present embodiment, the appropriate range RNG1 is set to just include ±10 pixels centering on a point of the distance Z1.

Then, based on the total number N of the evaluation samples and the number M of the evaluation samples in the appropriate range RNG1, an appropriateness ratio r (r=M/N) is calculated. The appropriateness ratio r indicates a ratio of the number of the evaluation samples in the appropriate range RNG1 to the total number of the evaluation samples. Therefore, the more closely distance values of the evaluation samples are converged on the distance Z1, the larger the appropriateness ratio r, and conversely, the more scattered the distance values, the smaller the appropriateness ratio r. Thus, by comparing the calculated appropriateness ratio r with a properly set threshold value r th in step 8, it is possible to evaluate the reliability of the distance data d calculated (step 9).

Specifically, if the appropriateness ratio r is equal to or greater than the threshold value r th, the testing section 13 judges that reliable distance data d have been calculated and gives test results "OK" (step 10). In this case, the examination device 14 notifies the examiner that the test results are "good," upon receiving the test results from the testing section 13. Contrary to this, if the appropriateness ratio r is under the threshold value r th, the testing section 13 judges that the distance data d calculated are abnormal and gives test results "NG" (step 11). In this case, the examination device 14 notifies the examiner that the test results are "no good," upon receiving the test results from the testing section 13.

As would be understood from the aforementioned discussion, the test chart located at the predetermined position ahead of the vehicle is photographed by the left and right cameras 1, 2 at first in an examination method of this embodiment. Then, adopting the distance data d concerning the brightness pattern shown in the photographed images as evaluation samples, the presence or absence of any anomaly in the calculation of the distance data is examined. If the distance data d have been correctly calculated, the distance values of the evaluation samples are converged around the point of the distance Z1 to the test chart 21. However, when there exist any anomaly, variations would occur in the distance values, or the distance values would deviate from the point of the distance Z1 around which they should normally converge. One of likely causes which may develop such a situation is an error in mounting positions of the left and right cameras 1, 2 (especially their positional error in a vertical direction (pitch direction) or in a rotational direction (roll direction)). Other likely causes would be unbalanced sensitivity of the left and right cameras 1, 2 and the influence of camera lens properties. Furthermore, an anomaly in the calculation of the distance data d could occur when a proper correction is not made by the correction circuit 5. When the test results of the test samples are "NG," it is necessary to take remedial action, such as readjustment of the mounting positions of the left and right cameras 1, 2 or adjustment of the sensitivity balance.

The aforementioned examination is carried out automatically by the microcomputer 9 as seen above in this embodiment. Accordingly, this embodiment is advantageous in that it makes it possible to achieve improved efficiency of the testing process and yet ensures objectivity of the test results.

Also, the random pattern shown in FIG. 5 is used as the brightness pattern in this embodiment. Since there is no regularity in the brightness variations in this random pattern, the tendency of the distance values of the evaluation samples to center on the point (vicinity) of the distance Z1 increases only when the stereo matching operation has been properly performed (that is, only when proper parallaxes have been calculated). Therefore, it becomes possible to even more improve the accuracy of judgment if the appropriateness ratio r is calculated by using such a random pattern.

Second Embodiment

Figure 3:
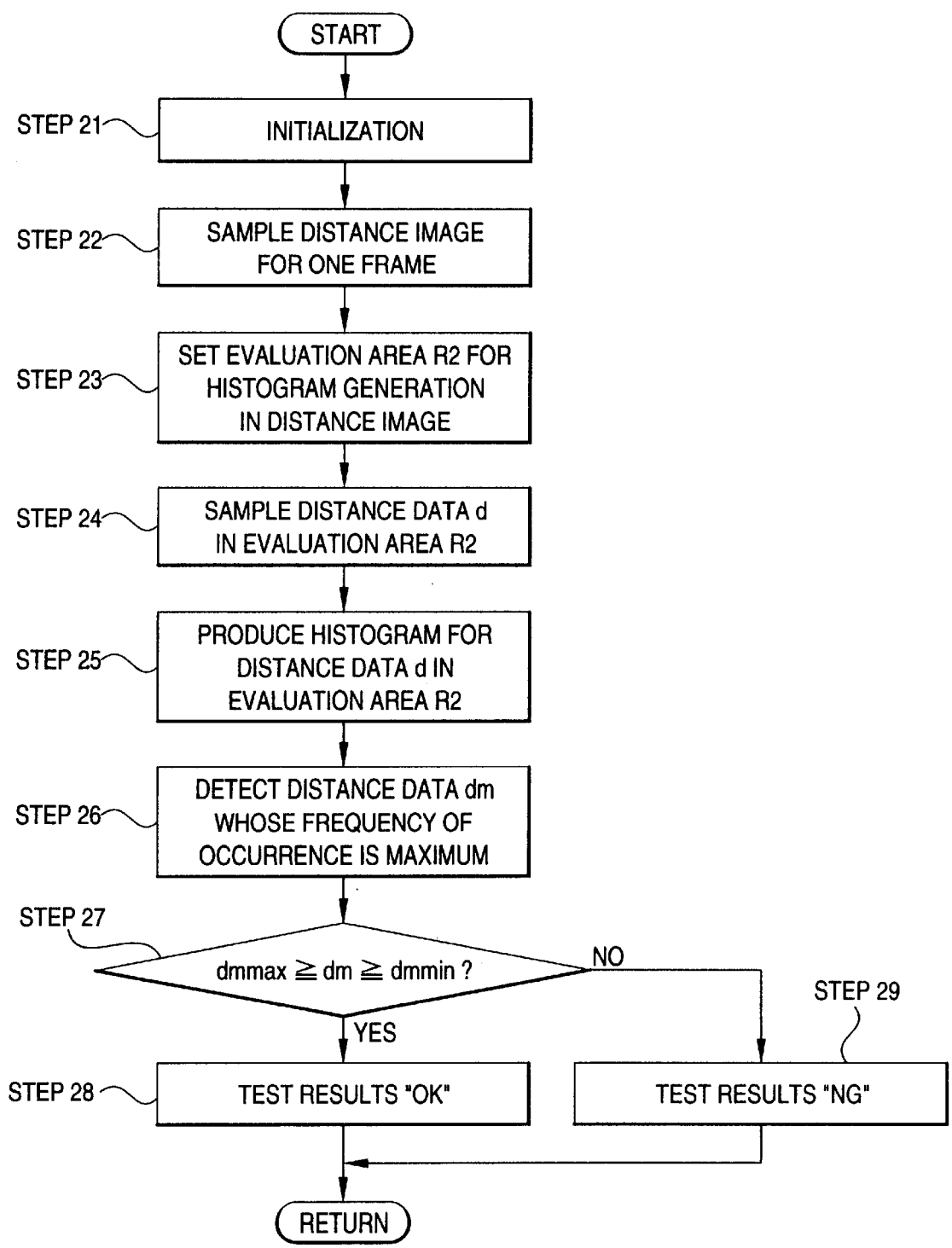
FIG. 3 is a flowchart showing a procedure of examining calculated distances according to a second embodiment.

FIG. 3 is a flowchart showing a procedure of examining calculated distances according to a second embodiment. Examination of this embodiment can be performed by using the system configuration shown in FIG. 1, as is the case with the first embodiment. With the test chart 21 depicted in FIG. 5 placed at the specified position ahead of the vehicle (refer to FIG. 4), the examiner enters a command to start an examination routine from the examination device 14 to the testing section 13. When the examination routine has been started, the testing section 13 first performs system initialization (step 21) and, then, samples a distance image for one complete frame (step 22).

Figure 7:
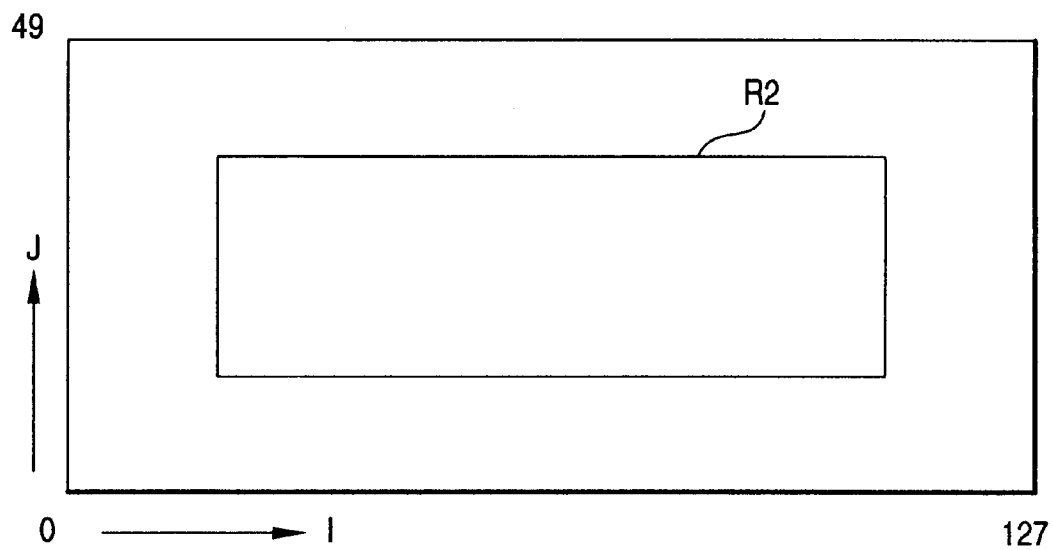
FIG. 7 is a diagram showing an evaluation area R2 set in the distance image.

Succeeding to step 22, an evaluation area R2 for which a histogram is to be produced is set in the distance image (step 23), and distance data d in the evaluation area R2 are sampled as evaluation samples (step 24). A brightness pattern of the test chart 21 is represented in this evaluation area R2. FIG. 7 is a diagram showing the evaluation area R2 set in the distance image. The evaluation area R2 is set in a region excluding peripheral parts of the distance image and has a smaller area than the evaluation area R1 shown in FIG. 6. This is because an evaluation subject in the examination of this embodiment is distance values themselves calculated in accordance with a later-described process (the evaluation subject in the first embodiment is the number of the distance data d). There is a possibility that errors contained in calculated distances increase if camera lens distortion is large. Therefore, the evaluation area R2 is set in a region where the camera lens distortion is less influential, or in a region narrower than the evaluation area R1.

In step 25, a histogram showing a relationship between the values of the distance data within the evaluation area R2 and their frequency of occurrence is produced (refer to FIG. 8). Then, a value dm of the distance data of which frequency of occurrence is maximum in the histogram is detected (step 26). This distance value dm is the distance value of a peak that appears in the histogram.

In step 27 which follows step 26, a judgment is made as to whether the distance value dm of the maximum frequency of occurrence (or the peak distance value) exists within an appropriate range RNG2: dmmin<dm<dmmax. This appropriate range RNG2 is set based on the distance Z1 to the test chart 21 and serves as a reference in judging compliance or non-compliance of the distance value dm. In the present embodiment, the appropriate range RNG2 is set to just include ±5 pixels centering on a point of the distance Z1.

If the judgment result in step 27 is in the affirmative, the testing section 13 judges that reliable distance data d have been calculated and gives test results "OK" (step 28). In this case, the examination device 14 notifies the examiner that the test results are "good," upon receiving the test results from the testing section 13. Contrary to this, if the judgment result in step 27 is in the negative, the testing section 13 judges that the distance data d calculated are abnormal and gives test results "NG" (step 29). In this case, the examination device 14 notifies the examiner that the test results are "no good," upon receiving the test results from the testing section 13.

As would be understood from the aforementioned discussion, the distance values of the evaluation samples are converged around the point (vicinity) of the distance Z1 to the test chart 21 if the distance data d have been correctly calculated. Thus, the distance value dm of the maximum frequency of occurrence exists within the appropriate range RNG2. If, however, there exists any anomaly, the distance value dm would deviate from the point of the distance Z1 where it should normally be located. While likely causes which may develop such a situation are those described with reference to the first embodiment, the cause to be specially considered is deviation of the mounting position of the left and right cameras 1, 2 in yaw directions.

As so far described, this embodiment is advantageous in that it makes it possible to achieve improved efficiency of the testing process and yet ensures objectivity of the test results, as is the case with the first embodiment.

Third Embodiment

The above-described first and second embodiments produce the histogram of all the distance data d for the evaluation area R1 (or R2) set in the distance image and examine calculation results of the distance data d. In contrast to this, in a third embodiment of the present invention, the evaluation area R1 (or R2) is further divided into multiple evaluation sub-areas and calculation results of the distance data d are evaluated for each of the examination sub-areas thus divided.

Figure 9:
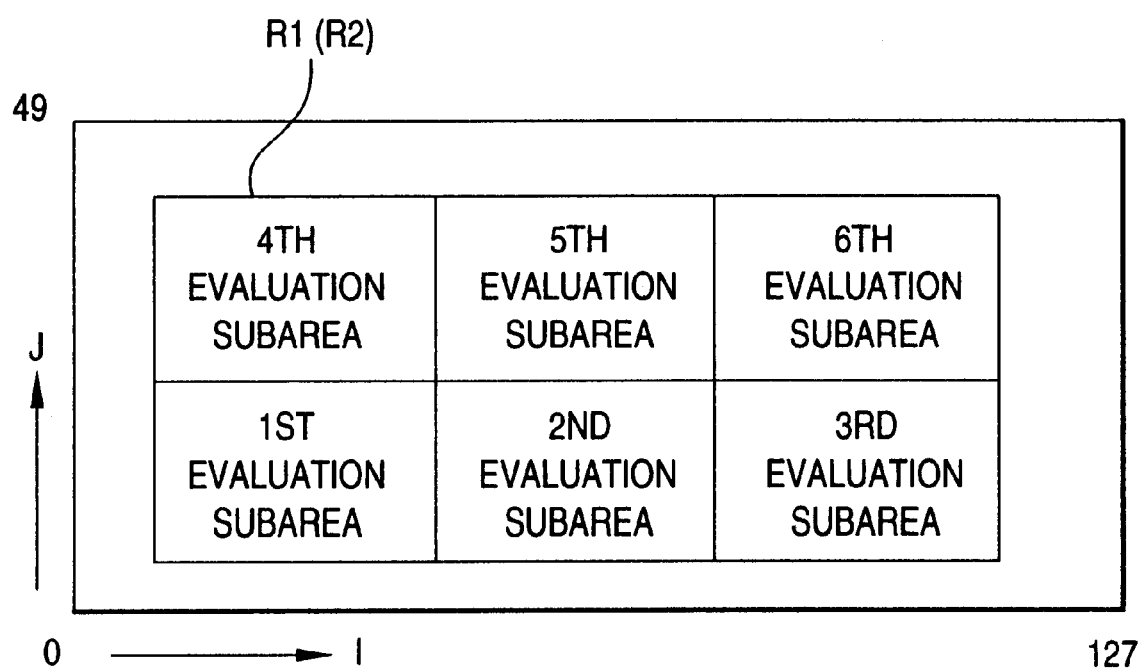
FIG. 9 is a diagram showing a plurality of evaluation sub-areas set in the distance image.

FIG. 9 is a diagram showing the multiple evaluation sub-areas set in the distance image. As shown in this Figure, the evaluation area R1 (R2) is set in a region excluding peripheral parts which are susceptible to the camera lens distortion. Just as an example, the evaluation area R1 (R2) is divided into six evaluation sub-areas in this Figure. Then, by using the examination method described in the first or second embodiment, the reliability of the distance data d is examined for each individual evaluation sub-area. If test results of the six evaluation sub-areas have been judged to be all "OK," the examination device 14 notifies the examiner that the test results are "good." On the contrary, if any of the six evaluation sub-areas is judged to be "NG," the examiner is notified that the relevant test samples are "no good."

This embodiment is advantageous in that it can detect an anomaly in the calculation of the distance data d with high accuracy, should such anomaly exist locally. Local anomalies in calculation tend to occur when a photographed image is rotated about its central part, for example. Referring to the example of FIG. 9, since the amount of rotational deviation is relatively small in the second and fifth evaluation sub-areas which are close to the center of the image, an appropriate distance Z1 might be calculated. In the first, third, fourth and sixth evaluation sub-areas where the amount of rotational deviation is greater due to their greater distance from the center of the image, however, anomalies in the calculation of the distance data d tend to occur compared to the second and fifth evaluation sub-areas. By examining the distance image for each of the evaluation sub-areas thus divided, it becomes possible to examine local anomalies in calculation with high accuracy compared to a case where the evaluation area R1 (or R2) is examined as a whole.

Fourth Embodiment

A fourth embodiment could be referred to as a variation of the second embodiment. In the second embodiment, a judgment in the examination is made based on the distance value dm whose frequency of occurrence marks a peak, or on the distance value dm of the maximum frequency of occurrence. However, it is often the case that distance values adjacent to such a peak provide important information (in such a case that the frequency of occurrence of a distance value adjacent to that of the peak point is slightly smaller than the maximum frequency of occurrence). In such circumstances, a peak distance value is calculated based on distance values of a peak portion (which includes the peak and its vicinity), and the judgment on anomalies in the calculation of the distance data d is made based on the peak distance value. Since this enables an improvement of the accuracy of the peak distance value, it becomes possible to detect an anomaly in the calculation of the distance data d with higher accuracy.

Such a peak distance value can be calculated by the following method, for example. First, a distance value dm having the maximum frequency of occurrence is obtained. Next, of left and right distance values d adjacent to this distance value dm, the value of a larger frequency of occurrence is identified. Then, a weighted average of the distance dm and the adjacent distance value d thus identified is obtained and the value of the weighted average is set as a peak distance value. A judgment on compliance or non-compliance of a test sample is made depending on whether the peak distance value thus calculated exists within an appropriate range.

Fifth Embodiment

A fifth embodiment could be referred to as a variation of the second embodiment, in which a peak distance value is calculated with a resolution of sub-pixel units, or with a resolution smaller than a pixel. Since this enables an improvement of the accuracy of the peak distance value, it becomes possible to detect an anomaly in the calculation of the distance data d with higher accuracy. The peak distance value in sub-pixel units can be calculated by the following method, for example.

First, distance data d in the evaluation area R2 are calculated in sub-pixel units. Reference should be made to Japanese Unexamined Patent Publication No. Hei. 10307352(JP-A-10-307352), if necessary, since a method of this calculation is disclosed therein. Next, as described in the second embodiment, a distance value dm of the maximum frequency of occurrence is obtained as the peak distance value. Then, an average sub-pixel value S at the distance value dm is calculated. Provided that the frequency of occurrence of the distance value dm is n and sub-pixel values of individual evaluation samples which give the same distance value dm when viewed in pixel units are between sp1 and spn, for example, their average sub-pixel value S is expressed by the following equation:

$$S = (sp1 + sp2 + \ldots spn)/n \qquad \text{(Equation 1)}$$

Then, a value obtained by adding the sub-pixel value S to the distance value dm is chosen as the peak distance value, and a judgment on compliance or non-compliance of a test sample is made depending on whether this peak distance value exists within an appropriate range.

Since the reliability of distance data calculated based on stereoscopic images can be automatically judged as seen above in the present invention, it is possible to achieve improved efficiency of a testing process.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A method for examining reliability of distance data calculated based on stereoscopic images, comprising:

obtaining a pair of photographed images by taking pictures of at least a test chart carrying a brightness pattern with a stereo camera, said test chart being placed in a shooting direction of said stereo camera with a predetermined distance from said stereo camera;

calculating said distance data from the pair of photographed images;

producing a histogram showing a relationship between distance values of evaluation samples and their frequency of occurrence by adopting said distance data concerning said test chart shown in said photographed images as said evaluation samples; and judging said reliability of said calculated distance data by evaluating properties of said produced histogram based on said predetermined distance between said stereo camera and said test chart.

2. The method for examining the distance data according to claim 1, wherein
said reliability of said calculated distance data is judged based on the ratio of the number of said evaluation samples included in an appropriate range set in said histogram to the total number of said evaluation samples in said judging step; and
said appropriate range is a specific distance range including said predetermined distance between said stereo camera and said test chart.

3. The method for examining the distance data according to claim 1, wherein
said reliability of said calculated distance data is judged based on whether a peak distance value in a peak portion of the frequency of occurrence in said histogram exists within an appropriate range in said judging step; and
said appropriate range is a specific distance range including said predetermined distance between said stereo camera and said test chart.

4. The method for examining the distance data according to claim 3, wherein
said peak distance value is a distance value having maximum frequency of occurrence.

5. The method for examining the distance data according to claim 3, wherein
said peak distance value is a value calculated based on a distance value having maximum frequency of occurrence and a distance value adjacent to said distance value having maximum frequency of occurrence in said histogram.

6. The method for examining the distance data according to claim 3, wherein said peak distance value is a distance value calculated in sub-pixel units.

7. The method for examining the distance data according to claim 1, wherein said brightness pattern has a configuration with blocks of the same shape while varying brightness gradations are arranged at random.

8. The method for examining the distance data according to claim 3, wherein
said producing step includes:
adopting said distance data corresponding to each of multiple evaluation sub-areas set in the photographed images as said evaluation samples; and
producing histograms showing a relationship between the distance values of said evaluation samples and their frequency of occurrence, and wherein said judging step includes:
determining whether peak distance values in peak portions of the frequency of occurrence exit within the appropriate range of each of said histograms; and
deciding that calculation results of the distance data are good when all of said peak distance values have been judged to exist within the appropriate range.

9. The method according to claim 1, wherein obtaining a pair of photographed images by taking pictures of a test chart carrying a brightness pattern with a stereo camera includes taking pictures of a test chart having a pattern of brightness blocks with gradations of brightness arranged to avoid any regularity in brightness variations.

10. The method according to claim 9 wherein there are 16 gray scale shades of gradations on the test chart.

11. A distance data examination device for examining reliability of distance data calculated based on stereoscopic images comprising:
a stereo camera fitted to a vehicle body and outputting a pair of photographed images by taking pictures of conditions ahead of said vehicle;
a stereo processing unit for calculating distance data from the pair of photographed images; and
an examination unit for judging said reliability of said calculated distance data based on said photographed images obtained by taking pictures of a test chart carrying a brightness pattern with said stereo camera, said test chart being placed at ahead of said vehicle during examination with a predetermined direction and distance from said stereo camera,
wherein said examination unit adopts said distance data corresponding to an evaluation area provided at a central part of each of said photographed images as evaluation samples, produces a histogram showing a relationship between distance values of said evaluation samples and their frequency of occurrence, and judges said reliability of said calculated distance data by evaluating properties of said produced histogram based on said predetermined distance between said stereo camera and said test chart.

12. The examination device according to claim 11, wherein
said examination unit judges said reliability of said calculated distance data based on the ratio of the number of said evaluation samples included in an appropriate range set in said histogram to the total number of said evaluation samples; and
said appropriate range is a specific distance range including said predetermined distance between said stereo camera and said test chart.

13. The examination device according to claim 11, wherein
said examination unit judges said reliability of said calculated distance data based on whether a distance value in a peak portion of the frequency of occurrence exists within an appropriate range; and
said appropriate range is a specific distance range including said predetermined distance between said stereo camera and said test chart.

14. The examination device according to claim 11, wherein said brightness pattern has a configuration with blocks of the same shape while varying brightness gradations are arranged at random.

15. The examination device according to claim 11, wherein
said examination unit adopts distance data corresponding to each of multiple evaluation sub-areas set in said photographed images in said calculated distance data as said evaluation samples, produces histograms showing a relationship between the distance values of said evaluation samples and their frequency of occurrence, judges whether peak distance values in peak portions of the frequency of occurrence exist within appropriate range for each of said histograms, and further judges that calculation results of the distance data are good when all of said peak distance values have been judged to exist within said appropriate range.

16. The examination device according to claim 11 wherein said histogram is based on a test chart brightness pattern comprised of brightness blocks with gradations of brightness arranged to avoid any regularity in brightness variations.

17. The examination device according to claim 16 wherein there are 16 gray scale shades of gradations on the test chart.

* * * * *